Aug. 24, 1965 R. J. BIBBERO 3,202,761
WAVEFORM IDENTIFICATION SYSTEM
Filed Oct. 14, 1960 4 Sheets-Sheet 1

INVENTOR.
ROBERT J. BIBBERO
BY Kenyon & Kenyon
ATTORNEYS

Aug. 24, 1965 R. J. BIBBERO 3,202,761

WAVEFORM IDENTIFICATION SYSTEM

Filed Oct. 14, 1960 4 Sheets-Sheet 2

INVENTOR.
Robert J. Bibbero
BY Kenyon & Kenyon
ATTORNEYS

Aug. 24, 1965 R. J. BIBBERO 3,202,761
WAVEFORM IDENTIFICATION SYSTEM
Filed Oct. 14, 1960 4 Sheets-Sheet 3

INVENTOR.
ROBERT J. BIBBERO
BY [signature]
ATTORNEYS

INVENTOR.
ROBERT J. BIBBERO
BY Kenyon & Kenyon
ATTORNEYS 3,202,761
WAVEFORM IDENTIFICATION SYSTEM
Robert J. Bibbero, Great Neck, N.Y., assignor to Bulova Research and Development Laboratories, Inc., Woodside, N.Y., a corporation of New York
Filed Oct. 14, 1960, Ser. No. 62,756
5 Claims. (Cl. 179—1)

This invention relates to wave identification systems, and more particularly to techniques and apparatus for identifying any sensory input transducible into an electrical waveform. This application is a continuation-in-part of my application Serial No. 6969, filed February 5, 1960, for "Word Identification System," and now abandoned.

The invention is usable for purposes of sound identification, visual identification and for industrial quality control. Thees three systems will be discussed in the above order.

Existing sound identification systems function to translate speech into coded data. These systems generally operate one or more parameters of speech, such as frequency, amplitude, phonetic patterns or the like. The coded data obtained therefrom is used to operate devices, such as phonetic typewriters, reducing the data to an intelligible form.

In the design of existing systems, emphasis has been placed upon the translation of speech into a simple form for the purpose of transmitting large amounts of coded speech over communication channels that are restricted in the quantity of coded data they can handle. Accordingly, attempts have been made to convert elementary sounds such as consonants, vowels and the like into their most significant coded representations.

Difficulties have been encountered in the selection of significant parameters of speech which will reliably distinguish between elementary sounds. Furthermore, when more than one speaker uses an existing system the variation in speech characteristics between speakers yields non-uniform results. Another disadvantage of these systems is the fact that coded data obtained therefrom represents only those characteristics of the original speech selected for translation and therefore is not in a form suited for written reproduction. Such systems are not suitable for use in installations requiring accurate recognition of a large number of voice commands which may be given by any one of a number of people.

Similar difficulties arise in visual identification systems. The flexibility of the visual identification system to be described herein and its wide tolerance to individual variations of symbols and format shows its great utility over current methods, which are limited to special symbols (such as those on certain credit cards), or to a few varieties of typewriter styles, or to special media, such as magnetic ink marks in coded form.

The process control system to be described herein provides a program of corrective measures actuated by deviations in plant product from the desired standard. A significant feature of this single-loop-closed-system is that corrective actions can be of any degree of complexity, i.e. involve the interaction of many controlling agents, without the sacrifice of stability which more frequently results from conventional multi-looped closed systems. Also, the corrective measures are determined by plant experience and so detailed knowledge of the dynamics or kinetics of the controlled process is not necessary.

Accordingly, it is the principal object of this invention to provide a system for recognition or identification of electrical waveforms representing sensed data, and to produce an output suitable for recording the data sensed or operating control machinery.

In particular, it is an object of this invention to provide a speech identification system capable of accurate and reliable recognition of speech.

It is another object of this invention to provide a speech recognition system that affords reliable recognition of any word included in a reference vocabulary independently of the style and character of the speaker's voice.

It is a further object of this invention to provide a speech recognition system which may be adapted to accommodate expansion of the reference vocabulary as required.

Still another object of this invention is to provide a speech recognition system capable of translating spoken commands having counterparts in a reference vocabulary into coded data or signals which may operate associated equipment according to the dictates of the command.

A significant advantage of this invention is that it may be used to facilitate the sorting of parcels and the like in a postal system in response to speech commands.

It is yet another object of this invention to provide a system for identification of fingerprints against a film file memory.

Also an object of this invention is to provide a device for "reading" symbolic material and operating a printing machine to transcribe said material.

It is the object of a third embodiment of this invention to provide a stable and reliable system for maintaining quality control of continuous industrial processes.

Briefly stated, the invention includes means for sensing an object, symbol image or other phenomenon and for conversion of the sensed impression into an enlectrical impulse or waveform. This waveform is compared to a number of waveforms stored in the system's memory, and the best match is selected. The stored waveform selected has associated with it a code suitable for operating control machinery or recording the sensed phenomenon.

A voice identification system constructed in accordance with the invention accomplishes the foregoing objects by the provision of means for comparing the whole pattern of a word command to be identified with the pattern of each word stored in a reference vocabulary. The results of the comparisons are monitored and the closest match selected as indicative of the appropriate word in the reference vocabulary. Either sounds, words, or groups of words may be identified in this manner.

The pattern selected from the "reference vocabulary" has associated with it coded data operating machinery executing the command.

In the case of visual identification, fingerprints, symbols or the like, these may be sensed by a television pickup tube, the electrical waveform compared with impulses from a pick-up tube reviewing a coded memory film upon which fingerprints or symbols are cataloged, and the "best match" recorded.

In the case of quality control, a process may be sampled by a device capable of converting the sample analysis into electrical form, the sample analysis waveform may be compared with stored analysis, and the process controlled by corrective instructions coded to the stored analysis best corresponding to the sample.

These and other features of the invention will become apparent from the following detailed description thereof, taken in conjunction with the several figures of the drawings, in which:

FIG. 3 is a detailed block diagram of a practical embodiment of the speech recognition system of FIG. 1.

FIG. 6 is a detailed block diagram of the process control system of FIG. 5.

Figure 1:
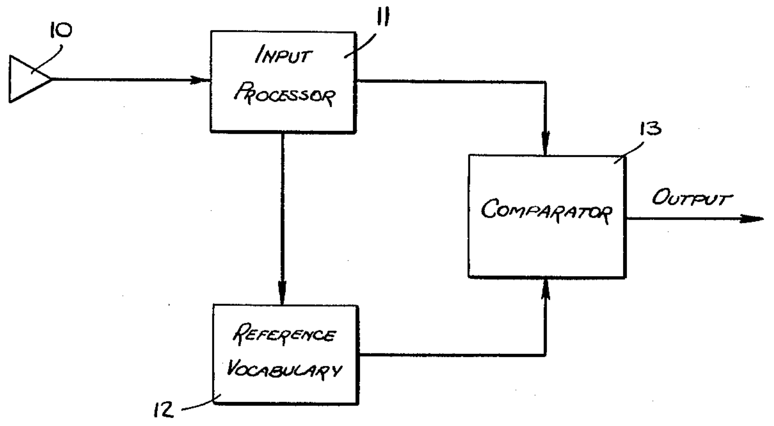
FIG. 1 is a generalized block diagram of a speech recognition system in accordance with the invention.

Referring now to FIG. 1, the basic elements of the invention are shown. The word to be recognized is introduced into the system by means of device 10, which may be microphone or other means producing the electrical equivalent of an audio signal. Input processor 11 is responsive to the electrical signal from device 10, and converts this electrical signal into a form suitable for comparison.

Figure 2:
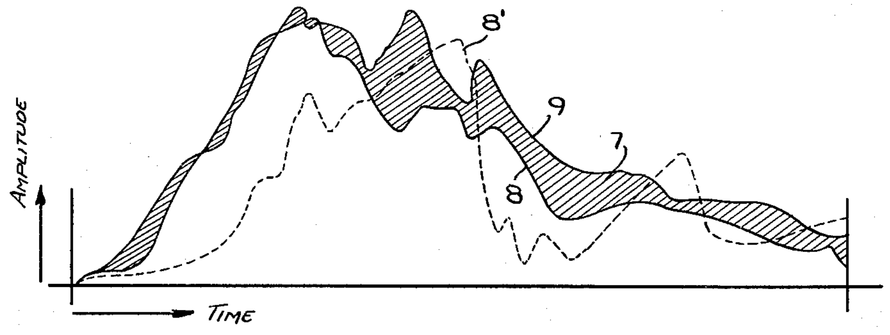
FIG. 2 is a representation of a comparison of two word patterns originating from different speakers.
Figure 2:
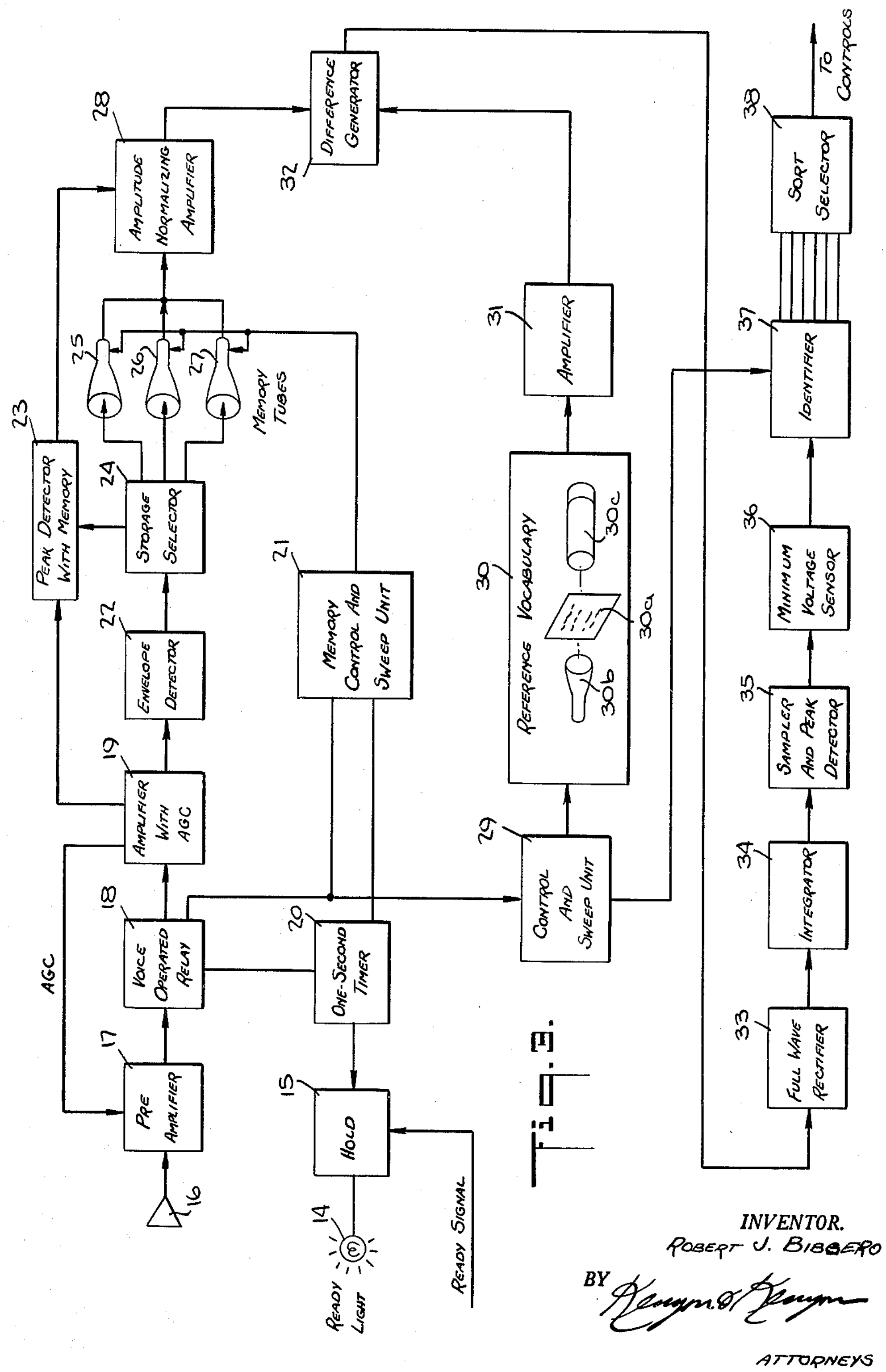

The form of the word to be identified and the form in which words are stored in reference vocabulary 12 are exemplified in FIG. 2. FIG. 2 shows word forms obtained by demodulating and rectifying the electrical equivalents of the original audio signal. The form is an envelope which follows the peaks of all the various frequency components contained in the original audio. Forms obtained from processes such as frequency analysis, differentiation, and the like may be employed instead. Form 8 is the envelope of a stored reference word while form 9, which is compared therewith, represents the envelope of a word to be identified.

Input processor 11 may store the converted word form and read it out once for every comparison to be made with a word from reference vocabulary 12. Each time the word from input processor 11 is provided to comparator 13, a word from reference vocabulary 12 is simultaneously provided to a second input of comparator 13. Comparator 13 measures the mismatch between the signals representing the two words.

This mismatch is indicated by the dark area 7 between the two waveforms in FIG. 2. Values of instantaneous mismatch are integrated over the period of the word comparison, yielding a voltage summing up the overall mismatch between the two words. The voltage signifying the overall mismatch is a potential approaching zero volts the more closely the two words are identical.

Comparator 13 monitors the results of each word comparison and remembers the last closest match until a still closer match occurs, in which event the latter is remembered instead. After every word stored in reference vocabulary 12 has been compared with the incoming word to be identified, comparator 13 generates a code identifying the closest match. In FIG. 2, form 8' represents another stored word, and it will be obvious that as between stored forms 8 and 8', the closest match for incoming word 9 is made with form 8.

Referring now to FIG. 3, an apparatus constructed in accordance with the invention suitable for sorting parcels is shown. The system embodied by this apparatus is ready for operation when ready light 14 is lit, indicating that a ready signal is provided from associated sorting equipment, and that one second or more has elapsed since the start of the previous voice input to the system.

The operator speaks a command included within the reference vocabulary of the system into microphone 16. For example, for postal sorting purposes, the system may store the names of all cities and towns in the State of New York, and the command may be "New Rochelle." The audio signal from microphone 16 is amplified by pre-amplifier 17, and the output of pre-amplifier 17 is fed to voice-operated relay 18. Voice-operated relay 18 is actuated by the presence of the amplified audio signal, and passes the amplified audio signal on to an amplifier 19 with automatic gain control. In addition, voice-operated relay 18 causes the one second timer 20 to extinguish the ready light 14 and also initiates the "write" sweep generator in memory control and sweep unit 21.

The audio signal is further amplified by AGC amplifier 19, the level of the audio signal being regulated by the automatic gain control. Automatic gain control voltage is also fed back to pre-amplifier 17 better to regulate the audio level. The audio output from amplifier 19 is demodulated and rectified in an envelope detector 22, yielding the type of word form shown in FIG. 2. The audio output from amplifier 19 is also applied to a peak detector 23, which senses the maximum amplitude of the audio signal and remembers the maximum amplitude value for later use in the comparison process.

The waveform from envelope detector 22 is channeled through a storage selector 24 to the particular memory tube selected for writing. Three cathode-ray memory tubes 25, 26 and 27 are used to facilitate maximum system capacity. While one memory tube has the present word written into it, another is reading out the previously stored word, and the third is being erased. The waveform is written into a memory tube as a density modulated electron charge on the storage surface of the memory tube.

At the completion of the spoken word, voice-operated relay 18 is de-energized. The time interval of the spoken word, as determined by the time interval voice-operated relay 18 was actuated, is used to vary the sweep rate of read sweeps applied to the memory tube containing that word. The sweep rate is varied so that the effective word length is normalized to the word length of the reference vocabulary.

At the end of the one second from the beginning of the spoken word, the functions of the three memory tubes are switched by the operation of one second timer 20 so that the tube just erased is ready for writing, the tube just written on is ready for read out, and the tube just read out is erased. If the ready signal from associated equipment is present, ready light 14 is lit, indicating the system is ready for another word input.

Also at the end of one second from the beginning of the spoken word, one second timer 20 triggers memory control and sweep unit 21, causing read out of the memory tube just written in. In addition, one second timer triggers flying-spot control and sweep unit 29, causing read out of reference vocabulary 30 and providing a counting pulse for each word read to identifier 37.

Alternatively, circuitry may be arranged to take advantage of the fact that the speaking of a word may take considerably less than one second. This circuitry may be arranged so that the memory tube functions are switched and a new word comparison sequence is initiated upon the fulfilling of two conditions: the completion of the word presently being spoken, and the completion of the comparison sequence presently being performed. This circuitry would allow a comparison sequence to begin upon a written-in word immediately after it was spoken. Such circuitry would replace the functions of the one-second timer.

The memory tube is read out at a sweep rate many times faster than the rate at which the word was written in. The increase in sweep rate speed allows many hundreds of comparisons to be made during the one-second interval provided for search of the reference vocabulary.

The stored waveform of the word to be identified is read out of the memory tube selected for read out and the signal is provided to amplitude normalizing amplifier 28. The maximum amplitude of the word, which is remembered in peak detector 23, is provided to amplitude normalizing amplifier 28 for the purpose of normalizing amplitude of the waveform of the word to be identified with respect to the amplitude of the waveforms in the reference vocabulary.

The waveform of the word to be identified, normalized with respect to time base and amplitude of waveforms in the reference vocabulary is provided as one input to difference generator 32.

The waveforms stored in reference vocabulary 30 are stored in the form of a density modulated area on a photographic transparency 30a. The waveforms are read out from the transparency by means of a flying spot scanner 30b. The signal picked up by detector 30c is amplified by amplifier 31 and provided as a second input to difference generator 32.

The best match does not necessarily occur when the beginning of the waveforms to be compared are in phase, because of variations in individual speech rates. To insure the finding of a best match, each waveform of a word in the reference vocabulary is compared eleven times with the waveform of the word to be identified. Each time, the phase of the waveform in the reference vocabulary is shifted by 2% with respect to the phase of the waveform to be identified. In one of the eleven comparisons, the beginnings of the waveforms to be compared are in phase. Five of the eleven comparisons are made with the phase of the reference word waveform progressively advanced with respect to the waveform of the word to be identified in steps of 2%. Five of the eleven comparisons are made with the phase of the reference word waveform progressively retarded with respect to the waveform of the word to be identified.

Difference generator 32 and the devices following it perform the functions of comparator 13 in FIG. 1. The means represented by difference generator 32 and the devices following employ a method claimed in U.S. Patent No. 2,679,636, issued May 25, 1957 to Curtis Hillyer. This patent discloses means for substracting the instantaneous amplitudes of two waves to obtain a third wave which is then integrated to determine the degree of match. It is understood that this invention may employ other means for comparison. For example, formal cross-correlation methods may be employed instead.

Difference generator 32 produces the instantaneous difference between the amplitudes of the two waveforms being compared. The output of difference generator 32 is rectified by full wave rectifier 33, giving a signal representing the absolute value of the difference. The amplitude of this signal corresponds to the vertical cross-sections of the dark area 7 shown in FIG. 2. The output of full wave rectifier 33 is integrated by integrator 34, producing a voltage which is the sum of the absolute difference with respect to the time interval of the waveform.

The integrated difference voltage is sampled by sampler and peak detector 35 and the result compared to the last lowest integrated difference voltage, which is retained in minimum voltage sensor 36. Minimum voltage sensor holds the lowest sampler output until a lower sampler output occurs. In this case, minimum voltage sensor 36 discards the value held, and retains the new low. Each time minimum voltage sensor 36 detects a new minimum, it sends a trigger to identifier 37.

Identifier 37 consists of two digital registers. One register counts the pulses supplied to it from control and sweep unit 29. The total count at any time is the key to the word being read out from reference vocabulary 30. The second register records the count in the first register each time a trigger is provided for minimum voltage sensor 36. In this manner, the key to the closest match obtained is retained in the second register. After the vocabulary has been completely searched, the second register contains the key to the word yielding the closest match during the search. At the end of the vocabulary search, the identifier code contained in the second register is transferred to sort selector 38, which programs associated equipment according to the dictates of the word command.

Means for protecting the system against the consequences of extraneous sound inputs may be provided. Input filters which reject transients having a rise time in excess of a preset minimum may be provided. This will afford protection against loud or sudden noises such as coughs, sneezes, and banging of objects. A switch may be provided which must be operated by the speaker before the system can function. A reset button which would erase an incorrect command is feasible. The most common incorrect sounds may be stored in the reference vocabulary.

It is understood that the invention is not limited to the word recognition but comprehends recognition of any pattern representative of any of the characteristics of sound.

An example of this application is the recognition of submarine propeller or hull sounds as differentiated from other underwater sounds; fish noises and the like. Another example is the identification of aircraft types by sound; e.g, single and multi-jet engines, helicopters, propeller and turboprop aircraft all have distinctive sound patterns which can be stored and recognized.

The vocabulary of the system shown in FIG. 3 may be increased without a corresponding increase in vocabulary searching time by paralleling similar systems. If two such systems are used, the sound input is provided to both systems simultaneously. Each system then functions independently through to the output of the sampler and peak detector 35. Means are provided to survey the minimum detection of each system, and the lower is selected, signifying the best match of the two systems and thus the best match of the combined vocabularies.

As stated earlier, the wave identification capabilities of this invention are not limited to mere sound identification, but may be used to identify an image, object or phenomenon transducible into electrical impulses.

This device 10 need not be a microphone or other sound sensitive device, but may be any kind of a transducer which has an electrical waveform for an output. The remainder of the apparatus will perform a recognition function as described. Instead of a "reference vocabulary," a memory of waveforms recorded as density modulated areas on a photographic transparency may be used.

Thus, as a second embodiment of this invention, the transducer 10 in FIG. 3 may be a television pick-up tube, e.g., a vidicon or image orthicon and associated scanning and power supply circuits. The images to be recognized may be the 52 letters of the alphabet (upper and lower case), the ten arabic numerals and the symbols and punctuation marks found in a standard typewriter. The memory or reference vocabulary 30, consists of waveforms resulting from the scanning of these symbols and their recording as density modulated areas on a photographic transparency. This scanning must be accomplished in a particular, reproducible manner, say by lines and frames as in a conventional television scan. Now, when any one of these symbols is presented to the input transducer, the apparatus will operate so as to recognize it, and the identifier 37 (FIG. 3) can be programmed as to perform some useful action, e.g., to punch a code hole in a computer tape or card, or to operate a typesetting machine. Thus, for example, the apparatus can be made to recognize typed or printed matter and to translate it into punched cards or tape for further processing.

Note that the utility of this apparatus in such an application is that many different sizes, styles and conditions of type can be identified with one memory store, owing to the amplitude and time normalizing circuits already disclosed; the phase variation scheme outlined previously, and the "best match" or cross-correlation circuitry utilized. By the same token, alignment of the image of the symbol and its orientation with respect to the transducer need not be exact.

As a further example of this mode of operation, entire words could be recognized as entities, if the appropriate waveforms were stored in the memory. Again, the handwritten signatures of individuals could be recognized and checked against stored samples, e.g., the signatures on bank checks could be screened by machine. In a similar manner, words handwritten by individuals could be recognized in some degree by comparison with a particular set of stored handwritten words in scanned waveform format; thus permitting machine "reading" of handwritten matter and its transference to typewritten form through control of an electrically driven typewriter, or use for control of bank accounting equipment, etc.

This second, or video, embodiment of the invention may, with appropriate transducers, scanning format and memory storage, be used to recognize non-symbolic material as well. For example, the visual pick-up variation described above can be applied to the problem of identifying fingerprints from a sample by comparison with a large file of prints.

Figure 4:
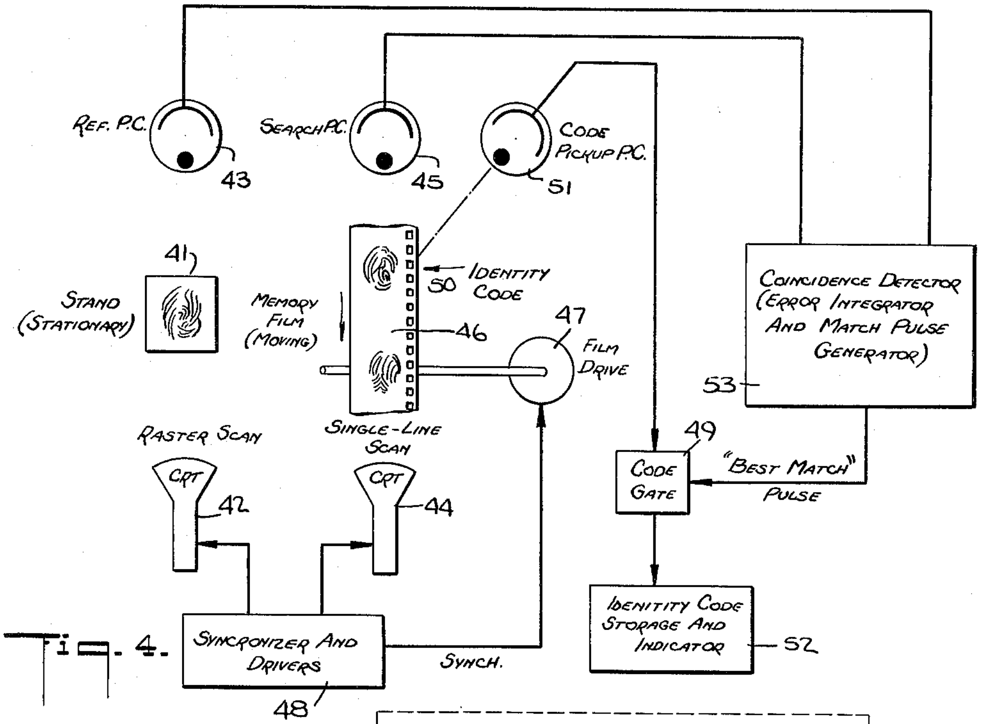
FIG. 4 is a block diagram of an embodiment of the invention suitable for identification of visual images.

FIG. 4 illustrates this application. A photographic transparency of a fingerprint 41 is scanned by a flying spot scanner 42, the photocell pick-up thereof 43 converting the characteristic fingerprint appearance to an electrical waveform. A similar scanner 44 and photocell 45 are used to read out a store of fingerprint files recorded on reels of film 46. The two scanners 42 and 44 and the film drive 47 are synchronized at 48.

Identification of the fingerprint in the file which is the best match to the unknown sample is accomplished by gating via code gate 49 an identity code 50 sensed by code pick-up 51 into an identifier 52 in a manner similar to that used in FIG. 3 in units 29 and 37, described above. The matching process itself is that described above and is represented by coincidence detector 53.

Non-symbolic matter, such as facial photographs, could also be stored in the "memory" portion of the apparatus. This would permit the faces of individuals to be recognized as they appear before a television camera, used as an input to the system. Alternately, the appearance of distinctive military targets as they appear to sensors such as airborne radar, IR scanner or TV cameras could be stored and the targets then recognized as they appear before the sensor. It is feasible, for example, to distinguish targets such as airfield runways, parked aircraft, or vehicles by the distinctive patterns they produce on these sensors. The recognition of these patterns on a photograph will permit the location as well as the presence and number of these targets to be recorded by several well-known techniques.

Figure 5:
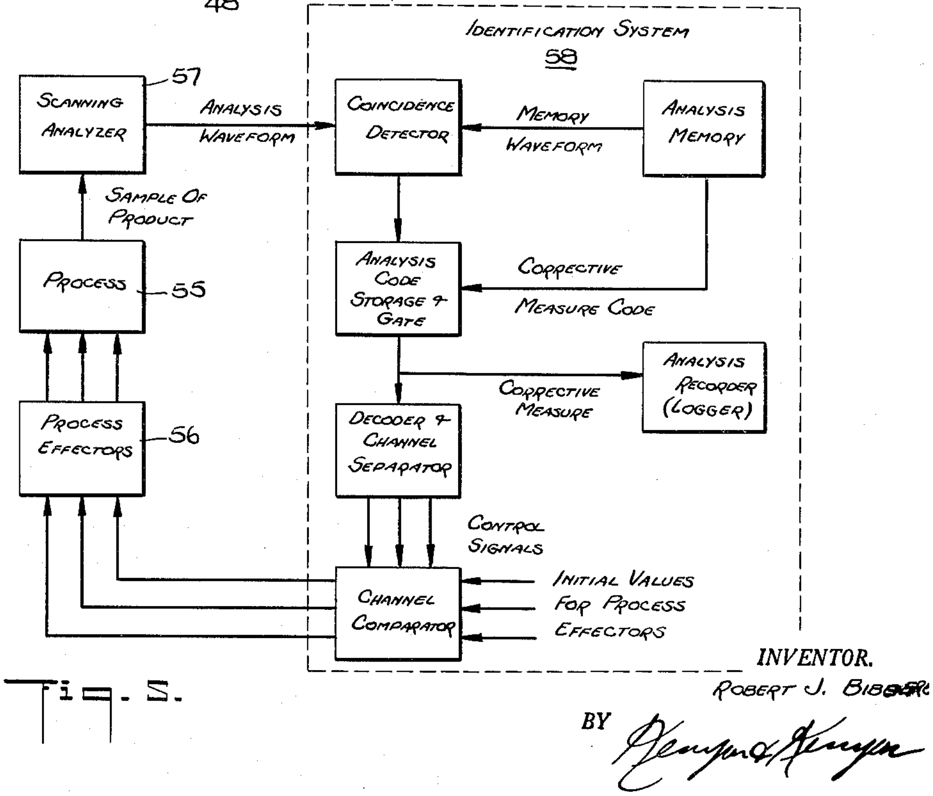
FIG. 5 is a generalized block diagram of an embodiment of the invention suitable for the control of industrial processes.
Figure 8:
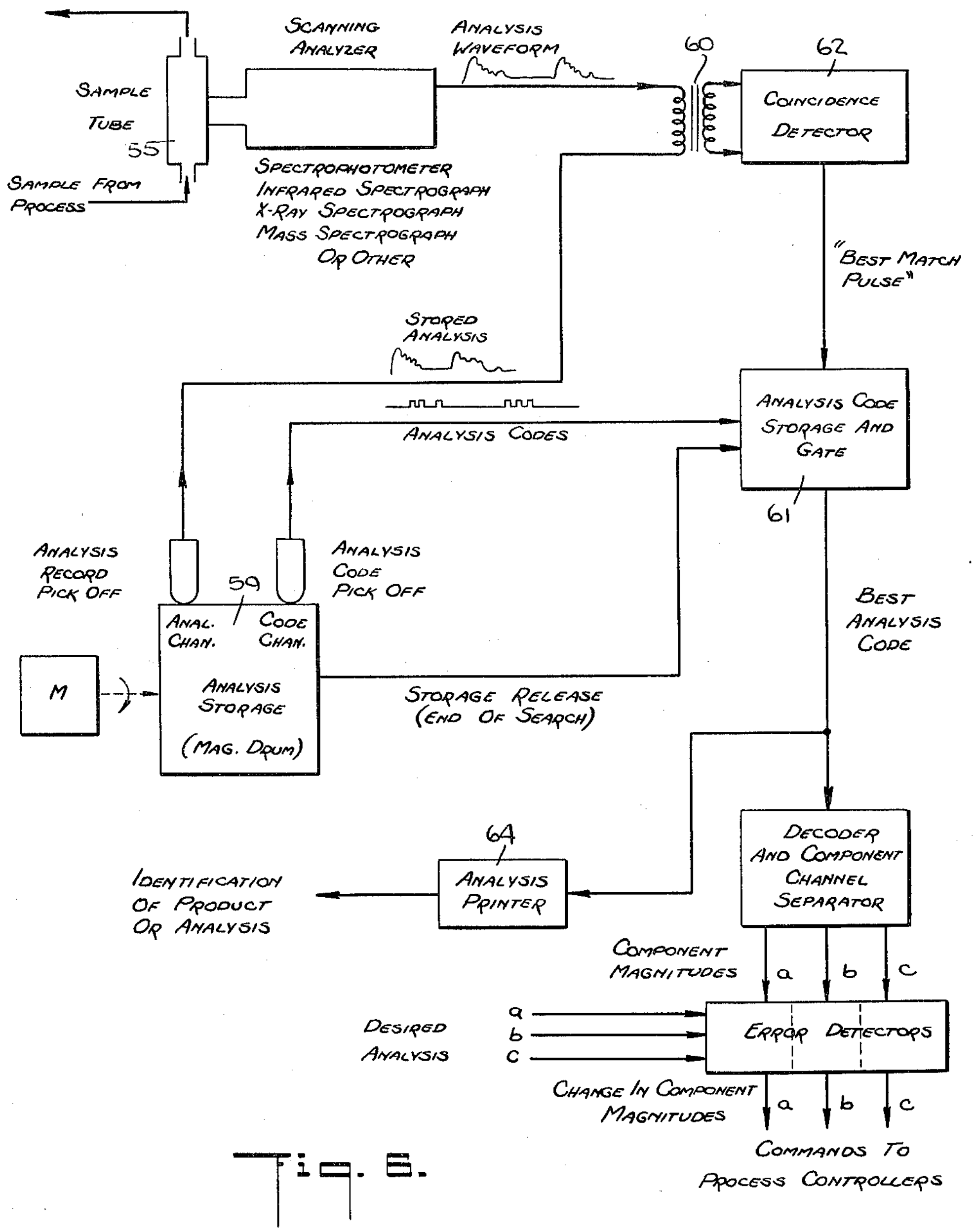

A third embodiment of the invention may be used to automatically control or analyze continuous processes, such as chemical plants. FIG. 5 illustrates this embodiment. A closed loop system is shown consisting of the process itself 55, effectors 56, a scanning analyzer 57 and an identification system 58.

The process effectors consist of conventional process controllers which operate valves, heaters and the like, directly affecting the state of the process and its product. The analyzer is some type of scanning device, such as a rapid-scan optical or infra-red spectrophotometer, an X-ray spectrograph or a mass spectrograph. The analyzer is equipped with means for converting its analysis to an electrical waveform. The identification system is then identical to the invention as previously described, utilizing the scanning analyzer as its input, and storing typical analysis waveforms in its memory. Each stored analysis waveform will represent some deviation from the ideal product or output from the process. These deviations may come about, for example, when the raw material (input) to the process is changed, or when environmental conditions change.

By experience with plant operations, it is possible to associate each product analysis deviation with some corrective measure, which represents the action that would be taken during manual control by a human operator. These corrective measures will normally consist of changes in settings of the desired value of the process variable, set into the controllers. The controller setting changes which are associated with each product deviation are also inserted into the "memory" of the waveform identification system, each along with the analysis waveform itself. For example, the controller setting changes can be in the form of a digital code. The process controllers must be modified to accept these coded signals and to change their desired value settings accordingly.

The operation of the embodiment just described may be explained as follows.

Referring to FIG. 6, a sample is taken from the process 55 and sensed by scanning analyzer 57, which transduces its input into an electrical waveform. This electrical waveform, or analysis waveform, is compared with analyses stored in magnetic drum or memory 59 by transformer 60. Corrective information associated with each stored analysis is simultaneously fed into analysis code storage and gate unit 61. Coincidence detector 62 triggers unit 61 whenever a new "best match" occurs, as described earlier. When the search is ended by exhaustion of the stored analysis, gate circuit 62 applies the "best match" coded data to a decoder 63 which analyzes the coded corrective data, and separates it into component channels. These components are applied to error detector 64 which correlates them with components representing the desired analysis and, finally, formulates the commands for effectors or process controllers 56.

The "best match" coded data is also recorded by analysis printer 64, providing a running record or "log" of the various process slates sampled.

While there have been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A word identification system comprising an input processor responsive to an electrical signal of varying frequency and amplitude equivalent of a word to be identified and having means to convert said electrical signal into a waveform corresponding to the envelope of said signal and suitable for comparison with similar waveforms of known words and having means to store said waveform suitable for comparison and having means to provide said waveform suitable for comparison as a repeated output of said input processor, a reference vocabulary memory device in which waveforms of a set of known words are stored having means to provide said waveforms of a set of known words as an output in a timed relationship with said repeated output of said input processor, and a comparator coupled to said repeated output of said input processor and the output of said reference vocabulary memory device to produce an indication of the closest match between said repeated output and said output of said reference vocabulary memory device.

2. The apparatus of claim 1 wherein said reference vocabulary memory device comprises a transparency whereon sound patterns are recorded, a flying-spot scanner adapted to scan said sound patterns sequentially, and a photosensitive device adapted to detect modulations of the beam from the flying-spot scanner caused by varying density of said sound patterns recorded on said transparency.

3. A word identification system comprising an input processor responsive to an electrical signal of varying frequency and amplitude equivalent of a word to be identified and having means to convert said electrical equivalent into a waveform corresponding to the envelope of said signal suitable for comparison with similar waveforms of known words and having means to store said waveform suitable for comparison and having means to provide said waveform suitable for comparison as a repeated output of said input processor, a reference vocabulary memory device in which waveforms of a set of known words are stored having means to provide said waveforms of a set of known words as an output in a timed relationship with said repeated output of said input processor, and a comparator coupled to said repeated output of said input processor and the output of said reference vocabulary memory device and having means to compare the amplitude of said waveform suitable for comparison with the amplitude of each of said waveforms of a set of known words and having means to integrate the difference of each comparison to produce a minimum voltage in the case of the match between said waveform suitable for comparison with the particular waveform of a set of known words which is most similar.

4. A word identification system comprising an input processor having means to convert a spoken word to be identified into a waveform representative of the envelope of the equivalent electrical signal of varying frequency and amplitude and suitable for comparison with similar waveforms of known words and having means to store said waveform suitable for comparison and having means to provide said waveform suitable for comparison at a rapid rate as a repeated output of said input processor, a reference vocabulary memory device in which waveforms of a set of known words are stored having means to provide said waveforms of a set of known words as an output in such a manner that each waveform of a known word may be compared several times with said waveform suitable for comparison, said waveform of a known word being slightly phase-shifted each time with respect to said waveform suitable for comparison, and a comparator coupled to said repeated output of said input processor and the output of said reference vocabulary memory device and having means to compare instantaneously the amplitudes of said waveform suitable for comparison with the instantaneous amplitudes of each of said waveforms of a set of known words and having means to integrate the difference of each comparison to produce a minimum voltage in the case the match between said waveform suitable for comparison with the particular waveform of a set of known words which is most similar.

5. A word identification system comprising input means to translate a spoken word to be identified into an electrical equivalent, demodulation and detection means coupled to said input means to convert said electrical equivalent into a waveform corresponding to the amplitude of said equivalent and suitable for comparison, memory means coupled to said demodulation and detection means to store said waveform suitable for comparison, memory control means coupled to said memory means to read out from said memory means said waveforms suitable for comparison at a very rapid rate and repeatedly, reference vocabulary means storing demodulated and detected waveforms of a set of known words, reference vocabulary control means coupled to said reference vocabulary means to read out from said reference vocabularly means each of said waveforms of a set of known words in any desired sequence and with any desired repetition and in any desired phase with respect to the output of said memory means, comparison means coupled to the output of said memory means and coupled to the output of said reference vocabulary means to compare the instantaneous amplitudes of said waveform suitable for comparison with the instantaneous amplitudes of each of said waveforms of a set of known words and indicating the closest match of all waveform comparisons.

References Cited by the Examiner

UNITED STATES PATENTS

| | | | |
|---|---|---|---|
| 2,575,910 | 11/51 | Mathes | 179—1 |
| 2,646,465 | 7/53 | Davis et al. | 179—1 |
| 2,685,615 | 8/54 | Biddulph et al. | 179—1 |
| 3,037,076 | 5/62 | Williams et al. | 179—1 |
| 3,037,077 | 5/62 | Williams et al. | 179—1 |

ROBERT H. ROSE, *Primary Examiner.*

L. MILLER ANDRUS, *Examiner.*